US012748718B2

(12) United States Patent
Da et al.

(10) Patent No.: US 12,748,718 B2
(45) Date of Patent: Sep. 29, 2026

(54) PERIPHERAL COMPONENT INTERCONNECT EXPRESS (PCIE) ACCELERATOR CARD RECEIVING DATA IN PROTOCOL STACK OF TCP/IP BY CALLING A SOCKET INTERFACE FUNCTION

(71) Applicant: Beijing Youzhuju Network Technology Co., Ltd., Beijing (CN)

(72) Inventors: Yu Da, Beijing (CN); Yongsu Zhang, Beijing (CN); Haiqiang Zhang, Beijing (CN); Shijian Ge, Beijing (CN); Yu Zhang, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 6 days.

(21) Appl. No.: 18/868,719

(22) PCT Filed: May 12, 2023

(86) PCT No.: PCT/CN2023/093779
§ 371 (c)(1),
(2) Date: Nov. 22, 2024

(87) PCT Pub. No.: WO2023/226787
PCT Pub. Date: Nov. 30, 2023

(65) Prior Publication Data

US 2026/0003817 A1 Jan. 1, 2026

(30) Foreign Application Priority Data

May 24, 2022 (CN) ........................ 202210578236.8

(51) Int. Cl.
*G06F 13/00* (2006.01)
*G06F 13/40* (2006.01)
*G06F 13/42* (2006.01)

(52) U.S. Cl.
CPC ........ *G06F 13/409* (2013.01); *G06F 13/4221* (2013.01); *G06F 2213/0026* (2013.01); *G06F 2213/40* (2013.01)

(58) Field of Classification Search
CPC ..... G06F 13/409; G06F 13/4221; G06F 13/00
See application file for complete search history.

(56) References Cited

U.S. PATENT DOCUMENTS 11,886,372 B1 * 1/2024 Ying .................. G06F 13/4221
12,074,931 B2 * 8/2024 Gao .................... H04L 65/4061
(Continued)

FOREIGN PATENT DOCUMENTS

CN 102123275 B 10/2012
CN 107193766 A 9/2017
(Continued)

OTHER PUBLICATIONS

ISA China National Intellectual Property Administration, International Search Report and Written Opinion Issued in Application No. PCT/CN2023/093779, Aug. 4, 2023, WIPO, 14 pages.
(Continued)

*Primary Examiner* — Tammara R Peyton
(74) *Attorney, Agent, or Firm* — Alleman Hall LLP

(57) ABSTRACT

An example method disclosed herein includes, in response to determining that there is data to be sent, calling a target interface to move the data into a target storage area pre-allocated on a double data rate synchronous dynamic random access memory of a target PCIE accelerator card. The data is data sent into a TCPI/IP protocol stack by a target application by calling a Socket interface function, and the
(Continued)

target interface is used for realizing communication between the protocol stack and the target PCIE accelerator card. The method includes calling the target interface to send a notification to a data receiving device. The notification is used for representing that the data to be sent has been stored in the target storage area. A host and the target PCIE accelerator cards can be on an IP network, thereby realizing communication between the host and the target PCIE accelerator cards.

16 Claims, 6 Drawing Sheets

(56) References Cited

U.S. PATENT DOCUMENTS

| | | | |
|---|---|---|---|
| 2020/0028930 | A1 | 1/2020 | Pope et al. |
| 2024/0419617 | A1 | 12/2024 | Wang et al. |

FOREIGN PATENT DOCUMENTS

| | | | |
|---|---|---|---|
| CN | 108228490 | A | 6/2018 |
| CN | 108897703 | A | 11/2018 |
| CN | 109358820 | A | 2/2019 |
| CN | 109787918 | A | 5/2019 |
| CN | 110109852 | A | 8/2019 |
| CN | 110177083 | A | 8/2019 |
| CN | 110177087 | A | 8/2019 |
| CN | 110221995 | A | 9/2019 |
| CN | 111031011 | A | 4/2020 |
| CN | 111327603 | A | 6/2020 |
| CN | 112698942 | A | 4/2021 |
| CN | 113179327 | A | 7/2021 |
| CN | 113868039 | A | 12/2021 |
| CN | 114064547 | A | 2/2022 |
| CN | 114443529 | A | 5/2022 |

OTHER PUBLICATIONS

First Office Action for Chinese Patent Application No. 202210578236.8, mailed on May 17, 2025, 22 pages.

China National Intellectual Property Administration, Office Action and Search Report Issued in Application No. 202210578236.8, Aug. 28, 2025, 22 pages.

* cited by examiner

PERIPHERAL COMPONENT INTERCONNECT EXPRESS (PCIE) ACCELERATOR CARD RECEIVING DATA IN PROTOCOL STACK OF TCP/IP BY CALLING A SOCKET INTERFACE FUNCTION

CROSS-REFERENCE TO RELATED APPLICATIONS

The present application claims the benefit of the priority from the International Patent Application No. PCT/CN2023/093779 and the CN patent for invention application Ser. No. 202210578236.8, titled as "COMMUNICATION METHOD, SYSTEM, AND APPARATUS, AND ELECTRONIC DEVICE" filed on May 24, 2022, both of which are hereby incorporated by reference in its entirety into the present application.

TECHNICAL FIELD

Embodiments of the present disclosure relate to the field of computer technology, and in particular, a communication method, system, and apparatus, and electronic device.

BACKGROUND ART

PCIE (Peripheral Component Interconnect Express) accelerator card is generally used to accelerate hardware of a specific processing flow and improve the processing capacity of a system. Usually, there are multiple PCIE accelerator cards on a host. There are communication requirements between the host and the PCIE accelerator cards, and between PCIE accelerator cards. Usually, the communication between the host and the PCIE accelerator cards is carried out through a ring buffer.

SUMMARY OF THE INVENTION

This portion of summary of the disclosure is provided to introduce a selection of concepts in a simplified form that are further described below in the portion of the preferred embodiments. This portion of summary of the disclosure is not intended to identify key features or essential features of the claimed subject matter, nor is it intended to be used to limit the scope of the claimed subject matter.

In a first aspect, an embodiment of the present disclosure provides a communication method applied to a data sending device, the method comprising: in response to determining that there is data to be sent, calling a target interface to move the data to be sent into a target storage area, wherein the target storage area is a storage area pre-allocated on a double data rate synchronous dynamic random access memory of a target accelerator card, the target accelerator card is a PCIE accelerator card, the data to be sent is data sent into a protocol stack of a transmission control protocol or an Internet interconnection protocol by a target application by calling a Socket interface function, and the target interface is configured for realizing communication between the protocol stack and the target accelerator card; and calling the target interface to send a notification to a data receiving device, wherein the notification is configured for representing that the data to be sent has been stored in the target storage area.

In a second aspect, an embodiment of the present disclosure provides a communication method applied to a data receiving device, the method comprising: in response to receiving a target notification, calling a target interface to acquire target data moved to a target storage area, wherein the target storage area is a storage area pre-allocated on a double data rate synchronous dynamic random access memory of a target accelerator card, the target notification is configured for representing that the target data has been stored in the target storage area, the target accelerator card is a PCIE accelerator card, and the target interface is configured for realizing communication between the protocol stack of transmission control protocol or Internet interconnection protocol and the target accelerator card; calling the target interface to parse the target data and submitting a parsing result to the protocol stack.

In a third aspect, an embodiment of the present disclosure provides a communication system, comprising: a data sending device configured for, in response to determining that there is data to be sent, calling a target interface to move the data to be sent into a target storage area, and sending a target notification to a date receiving device, wherein the target storage area is a storage area pre-allocated on a double data rate synchronous dynamic random access memory of a target accelerator card, the target accelerator card is a PCIE accelerator card, the data to be sent is data sent into a protocol stack of a transmission control protocol or an Internet interconnection protocol by a target application by calling a Socket interface function, and the target interface is configured for realizing communication between the protocol stack and the target accelerator card; the target notification is configured for representing that the data to be sent has been stored in the target storage area; the data receiving device is configured for, in response to receiving the target notification, calling the target interface to acquire the data to be sent moved to the target storage area, and parsing the data to be sent, and submitting a parsing result to the protocol stack.

In a fourth aspect, an embodiment of the present disclosure provides a communication apparatus provided in a data sending device, the apparatus comprising: a moving unit configured for, in response to determining that there is data to be sent, calling a target interface to move the data to be sent into a target storage area, wherein the target storage area is a storage area pre-allocated on a double data rate synchronous dynamic random access memory of a target accelerator card, the target accelerator card is a PCIE accelerator card, the data to be sent is data sent into a protocol stack of a transmission control protocol or an Internet interconnection protocol by a target application by calling a Socket interface function, and the target interface is configured for realizing communication between the protocol stack and the target accelerator card; and a sending unit configured for calling the target interface to send a notification to a data receiving device, wherein the notification is configured for representing that the data to be sent has been stored in the target storage area.

In a fifth aspect, an embodiment of the present disclosure provides a communication apparatus provided in a data receiving device, the apparatus comprising: an acquiring unit configured for, in response to receiving a target notification, calling a target interface to acquire target data moved to a target storage area, wherein the target storage area is a storage area pre-allocated on a double data rate synchronous dynamic random access memory of a target accelerator card, the target notification is configured for representing that the target data has been stored in the target storage area, the target accelerator card is a PCIE accelerator card, and the target interface is configured for realizing communication between the protocol stack of transmission control protocol or Internet interconnection protocol and the target accelerator card; a submitting unit configured for calling the target interface to parse the target data and submitting a parsing result to the protocol stack.

In a sixth aspect, an embodiment of the present disclosure provides an electronic device, comprising: at least one processor; a storage device configured for storing at least one program which, when executed by the at least one processor, causes the at least one processor to implement the communication method as in the first or second aspect.

In a seventh aspect, an embodiment of the present disclosure provides a computer-readable medium on which a computer program is stored, which when executed by a processor, implements steps of the method as in the first or second aspect.

BRIEF DESCRIPTION OF THE DRAWINGS

The above and other features, advantages and aspects of embodiments of the present disclosure will become more apparent by referring to the following preferred embodiments in conjunction with the accompanying drawings. Throughout the drawings, identical or similar reference numerals denote identical or similar elements. It should be understood that the drawings are schematic, and units and elements are not necessarily drawn to scale.

DETAILED DESCRIPTION OF PREFERRED EMBODIMENTS

Figure 1:
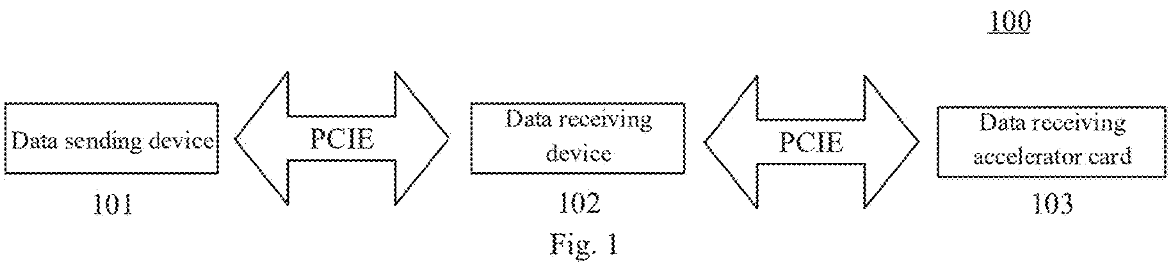
FIG. 1 is an exemplary system architecture diagram to which various embodiments of the present disclosure can be applied.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are used only for illustrative purposes, and are not used to limit the protection scope of the present disclosure.

It should be understood that steps described in the method embodiments of the present disclosure may be executed in different sequences and/or in parallel. Further, method embodiments may include additional steps and/or omit execution of illustrated steps. Scope of the present disclosure is not limited in this respect.

As used herein, the term "comprising" and its variants are open-ended including, that is, "including but not limited to". The term "based on" is "at least partially based on". The term "one embodiment" means "at least one embodiment"; the term "another embodiment" means "at least one other embodiment"; the term "some embodiments" means "at least some embodiments". Related definitions of other terms will be given in the below description.

It should be noted that such concepts as "first", "second" etc. mentioned in the present disclosure are only used to distinguish different devices, modules or units, and are not used to limit the order or interdependence of functions performed by these devices, modules or units.

It should be noted that such modifiers as "a" and "a plurality" mentioned in this disclosure are schematic rather than limiting, and those skilled in the art should understand that unless the context clearly indicates otherwise, they should be understood as "one or more".

Names of messages or information exchanged among multiple devices in the embodiments of the present disclosure are only used for illustrative purposes, and are not used to limit the scope of these messages or information.

FIG. 1 shows an exemplary system architecture 100 to which an embodiment of a communication method of the present disclosure can be applied.

As shown in FIG. 1, the system architecture 100 may comprise a data sending device 101 and a data receiving device 102. The communication between the data sending device 101 and the data receiving device 102 is usually realized by peripheral component interconnect express.

The data sending device 101 may interact with the data receiving device 102 to send or receive messages, etc. For example, the data sending device 101 may send a notification to the data receiving device 102.

The data sending device 101 may be hardware or software. When the data sending device 101 is hardware, it may be a host or a PCIE accelerator card installed on the host, and the host may comprise but not limited to a smart phone, a tablet computer, a laptop computer, etc. When the data sending device 101 is software, it can be installed in a host or a PCIE accelerator card. It can be implemented as multiple pieces of software or software modules (for example, multiple pieces of software or software modules for providing distributed services) or as a single software or software module. It is not specifically limited here.

The data sending device 101, in response to determining that there is data to be sent, can call a target interface for realizing communication between a protocol stack and a target accelerator card to move the data to be sent into a target storage area pre-allocated on a double data rate synchronous dynamic random access memory of a PCIE accelerator card, and then, can call the target interface to send a notification to a data receiving device 102, the notification configured for representing that the data to be sent has been stored in the target storage area.

The data receiving device 102, in response to receiving the target notification sent by the data sending device 101, can call the target interface for realizing the communication between the protocol stack and the target accelerator card to acquire target data moved to the pre-allocated storage area on the double-rate synchronous dynamic random access memory of the PCIE accelerator card; and then, can call the target interface to parse the target data, and submit a parsing result to the protocol stack of transmission control protocol or Internet protocol.

It should be noted that the data receiving device 102 may be hardware or software. When the data receiving device 102 is hardware, it may be a host or a PCIE accelerator card installed on the host, and the host may comprise but not limited to a server, a smart phone, a tablet computer, a laptop computer, etc. When the data receiving device 102 is software, it can be installed in a host or a PCIE accelerator card. It can be implemented as multiple pieces of software or software modules (for example, multiple pieces of software or software modules for providing distributed services) or as a single software or software module. It is not specifically limited here.

It should also be noted that the communication method provided by the embodiment of the present disclosure can be executed by the data sending device 101, and the communication device can be provided in the data sending device 101. The communication method provided by the embodiment of the present disclosure can also be executed by the data receiving device 102, and the communication device can also be provided in the data receiving device 102.

Here, if the data sending device 101 is a host, the data receiving device 102 here is usually a PCIE accelerator card. If the data sending device 101 is a PCIE accelerator card, the data receiving device 102 here is usually a host.

It should also be noted that if the data sending device 101 is a PCIE accelerator card and the data receiving device 102 is a host, the system architecture 100 here may further include a data receiving accelerator card 103. The data receiving accelerator card 103 is also usually installed on the host.

It should be understood that the number of data sending device, data receiving device and data receiving accelerator card in FIG. 1 is only schematic. There can be any number of data sending devices, data receiving devices and data receiving acceleration cards as needed in implementation.

Figure 2:
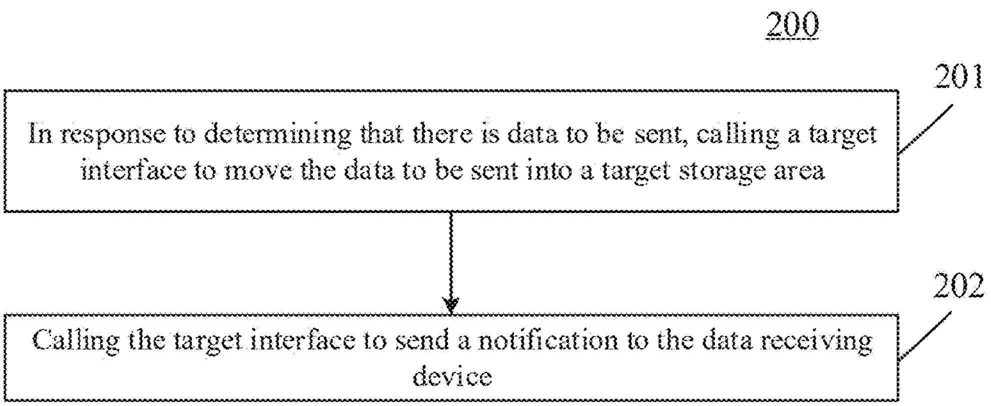
FIG. 2 is a flowchart of one embodiment of a communication method according to the present disclosure.

Further referring to FIG. 2, a flow 200 of one embodiment of a communication method according to the present disclosure is shown. The communication method is generally applied to a data sending device, the communication method comprising steps of the following:

Step 201: in response to determining that there is data to be sent, calling a target interface to move the data to be sent to a target storage area.

In this embodiment, an execution subject of the communication method (for example, the data sending device shown in FIG. 1) can determine whether there is data to be sent. The data to be sent is usually data sent to the protocol stack of the transmission control protocol or the Internet protocol (TCP/IP) by a target application calling a Socket interface function, and the target application can be an application operated by a current user. When the user uses the above target application, the target application will call the Socket interface function to send data to the protocol stack. Socket is an intermediate software abstraction layer for communication between an application layer and a TCP/IP protocol family, and it comprises a set of interfaces. In the design mode, Socket is actually a facade mode, which hides the complex TCP/IP protocol family behind the Socket interface. For the user, a simple set of interfaces is all, so that Socket can organize data to meet the specified protocol.

If it is determined that there is data to be sent, the execution subject can call the target interface to move the data to be sent to the target storage area. The target storage area is usually a pre-allocated storage area on the Double Data Rate (DDR) of the target accelerator card. The above target accelerator card is usually a Peripheral Component Interconnect Express accelerator card. PCIE accelerator card is generally configured to accelerate the hardware of a specific processing flow and improve the processing capacity of the system. Here, DDR in the PCIE accelerator card is configured to store running code and data. DDR can also be called DDR SDRAM (Synchronous Dynamic Random-Access Memory), which is a kind of memory. SDRAM transmits data once in a clock cycle, while DDR transmits data twice in a clock cycle, one on a rising edge and one on a falling edge, which means that one clock cycle can transmit 2 bits of data, so the data transmission rate of DDR is twice the clock frequency.

Here, the target interface is configured to realize the communication between the protocol stack and the target accelerator card. The target interface can also be called a PCIE-based network device sending interface, which is configured to store network data in the protocol stack into the PCIE accelerator card. At the beginning, the target interface needs to be registered with TCP/IP protocol stack as a standard network device sending interface, and the bottom layer calls this interface to complete data sending and receiving.

Step 202: calling the target interface to send a notification to the data receiving device.

In this embodiment, the execution subject can call the target interface to send a notification to the data receiving device, and the notification is configured to represent that the data to be sent has been stored in the target storage area.

After receiving the notification, the data receiving device can acquire the target data moved to the target storage area, and then can call the target interface to parse the target data and submit a parsing result to a TCP/IP protocol stack, which sends the parsing result to the target application through a Socket interface function.

Here, the PCIE accelerator card usually uses a virtual MAC address, which includes ID information of the corresponding PCIE accelerator card, so as to quickly locate the specific PCIE accelerator card when sending data. Besides, the PCIE accelerator card can set the host as a gateway, so as to realize communication with an external network device.

According to the method provided by the embodiment of the present disclosure, in response to determining that there is data to be sent, calling a target interface to move the data to be sent into a target storage area pre-allocated on a double data rate synchronous dynamic random access memory of a target accelerator card, and then, calling the target interface to send a notification to a data receiving device, the notification configured for representing that the data to be sent has been stored in the target storage area. In this way, the IP network device based on PCIE can be realized on the PCIE accelerator card, and the gateway device based on PCIE can be realized on the host. Finally, the host and all PCIE accelerator cards form an IP network to realize the communication between the host and the PCIE accelerator cards so that the functions such as PCIE card operation and maintenance management, hardware upgrade, software debugging and the like can be efficiently realized.

In some alternative implementations, the data sending device is usually a host, the target accelerator card is usually provided on the host, and the data receiving device is usually the target accelerator card, so as to realize communication between the host and the PCIE accelerator card provided on the host, in particular, to realize the function of sending data to the PCIE accelerator card by the host. The execution subject can call the target interface to move the data to be sent to the target storage area in the following manners: the execution subject (host) can call the target interface to move the data to be sent to the target storage area by Direct Memory Access (DMA). Direct memory access allows hardware devices with different speeds to communicate without relying on a large number of interruption loads of CPU (Central Processing Unit). Otherwise, the CPU needs to copy the data of each fragment from the source to a register, and then write it back to a new place again. During this period, the CPU is unavailable for other work.

In some alternative implementations, the data sending device is usually the target accelerator card, the data receiving device is usually a host, the target accelerator card is usually provided on the host, so as to realize communication between the host and the PCIE accelerator card provided on the host, in particular, to realize the function of sending data to the host by the PCIE accelerator card.

In some alternative implementations, the data sending device is usually the target accelerator card, the data receiving device is usually a host, the target accelerator card and target accelerator cards other than the target accelerator card are usually provided in the host, and the target storage area is usually a storage area in the target accelerator card, so as to realize communication between the host and a plurality of PCIE accelerator cards provided in the host, and in particular, to realize transmission of data by the PCIE accelerator card to the host, and then the host transmits data to the other PCIE accelerator cards.

In some alternative implementations, before calling the target interface to move the data to be sent to a target storage area, the execution subject may call the target interface to acquire a Buffer Descriptor (BD) from the target accelerator card. The above buffer descriptor can be configured to describe a state and an address of the memory in the double-rate synchronous dynamic random access memory DDR. The state of memory usually includes an idle state and an occupied state. Then, the execution subject can call the target interface to determine the target storage area based on the buffer descriptor. In particular, the execution subject can determine the address of the memory in the idle state through the buffer descriptor, so that the memory in the idle state can be used as the target storage area, so as to move the data to be sent to the memory in the idle state.

Figure 3:
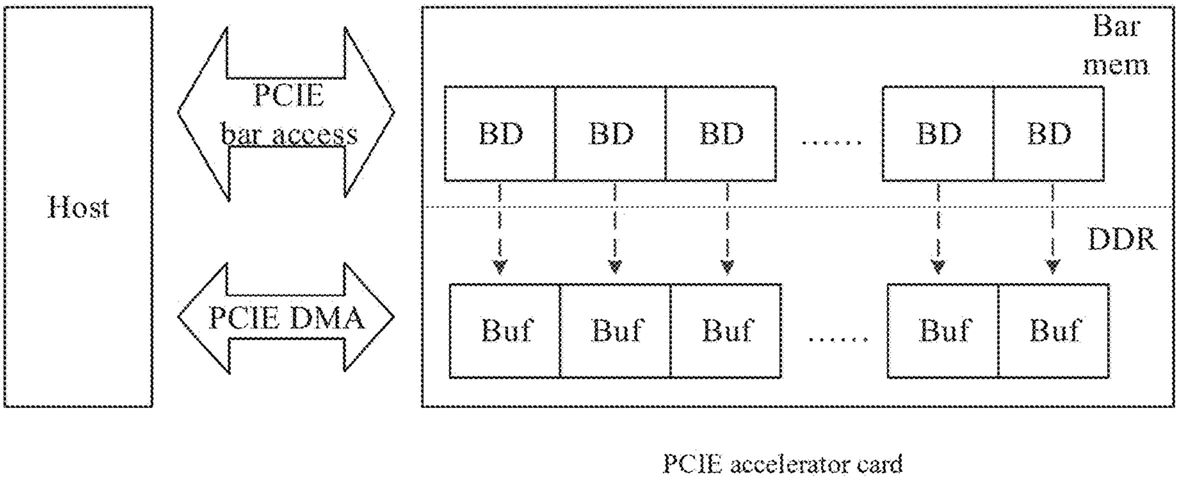
FIG. 3 is a schematic diagram of the interaction between a host and a PCIE accelerator card in the communication method according to the present disclosure.

Further referring to FIG. 3, FIG. 3 is a schematic diagram of the interaction between a host and a PCIE accelerator card in the communication method according to the present embodiment. In FIG. 3, the PCIE accelerator card includes a base address register storage space Bar mem and a double-rate synchronous dynamic random access memory DDR. The storage area Buf of data frame is pre-allocated on the double-rate synchronous dynamic random access memory DDR of PCIE accelerator card. The storage space Bar mem of the base address register includes a plurality of buffer descriptors (BDs), which are configured to describe the physical address of the corresponding memory and the state of the memory. Host can access the base address register storage space Bar mem by base address register access of the PCIE (bar access), and acquire the physical address of the memory in idle state from the buffer descriptor, so that data can be moved to the memory in idle state by direct memory access of PCIE (DMA).

Figure 4:
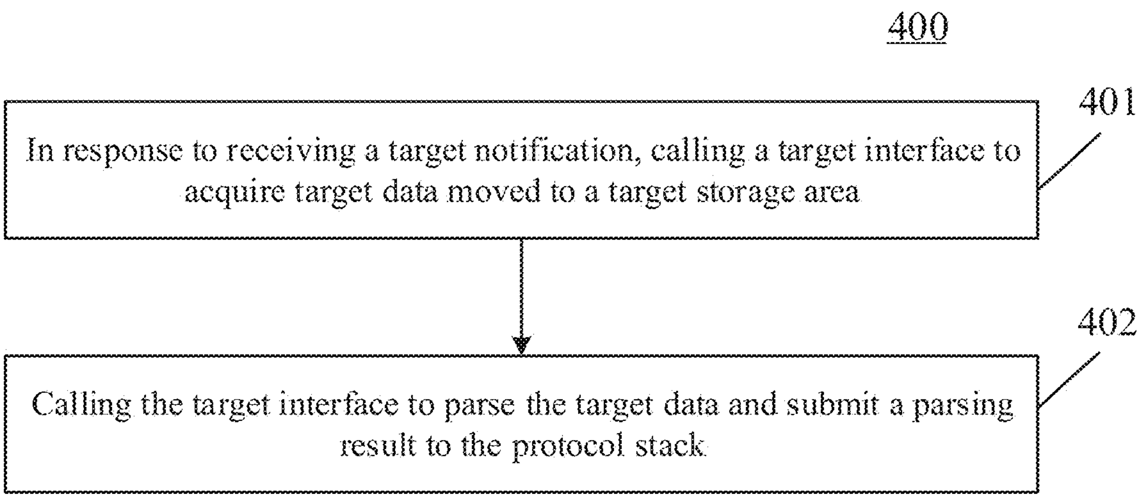
FIG. 4 is a flowchart of yet another embodiment of a communication method according to the present disclosure.

Further referring to FIG. 4, a flow 400 of yet another embodiment of a communication method is shown. The communication method is generally applied to a data sending device, the flow 400 of the communication method comprising steps of the following:

Step 401: in response to receiving a target notification, calling a target interface to acquire target data moved to a target storage area.

In this embodiment, an execution subject of the communication method (for example, the data receiving device shown in FIG. 1) can determine whether a target notification has been received. The target notification can be configured for representing that the target data has been stored in the target storage area. The target storage area is usually a pre-allocated storage area on the double-rate synchronous dynamic random access memory of the target accelerator card. The above target accelerator card is usually a Peripheral Component Interconnect Express accelerator card. PCIE accelerator card is generally configured to accelerate the hardware of a specific processing flow and improve the processing capacity of the system. Here, DDR in the PCIE accelerator card is configured to store running code and data. DDR, also known as DDR SDRAM, is one kind of memory. SDRAM transmits data once in a clock cycle, while DDR transmits data twice in a clock cycle, one on a rising edge and one on a falling edge, which means that one clock cycle can transmit 2 bits of data, so the data transmission rate of DDR is twice the clock frequency.

If the target notification is received, the execution subject can call the target interface to acquire the target data moved to the target storage area. The above-mentioned target data is usually the data moved to the target storage area after the data sending device determines that there is data to be sent.

The target interface is configured to realize the communication between the protocol stack of transmission control protocol or Internet interconnection protocol and the target accelerator card. The target interface can also be called a PCIE-based network device sending interface, which is configured to store network data in the protocol stack into the PCIE accelerator card. At the beginning, the target interface needs to be registered with TCP/IP protocol stack as a standard network device sending interface, and the bottom layer calls this interface to complete data sending and receiving.

Step 402: calling the target interface to parse the target data and submit a parsing result to the protocol stack.

In this embodiment, the execution subject can call the target interface to parse the target data and submit a parsing result to a TCP/IP protocol stack, which sends the parsing result to a target application through a Socket interface function. The target application may be an application operated by a current user. Socket is an intermediate software abstraction layer for communication between an application layer and a TCP/IP protocol family, and it comprises a set of interfaces. In the design mode, Socket is actually a facade mode, which hides the complex TCP/IP protocol family behind the Socket interface. For the user, a simple set of interfaces is all, so that Socket can organize data to meet the specified protocol.

According to the method provided by the embodiment of the present disclosure, in response to receiving a notification that data to be sent has been stored in a pre-allocated storage area on a double-rate synchronous dynamic random access memory of a PCIE accelerator card, calling a target interface to acquire the data to be sent that has been moved to the pre-allocated storage area of the PCIE accelerator card; then, calling the target interface to parse the target data, and submitting a parsing result to a TCP/IP protocol stack. In this way, the IP network device based on PCIE can be realized on the PCIE accelerator card, and the gateway device based on PCIE can be realized on the host. Finally, the host and all PCIE accelerator cards form an IP network to realize the communication between the host and the PCIE accelerator cards so that the functions such as PCIE card operation and maintenance management, hardware upgrade, software debugging and the like can be efficiently realized.

In some alternative implementations, the data receiving device is usually the target accelerator card, the target accelerator card is usually provided on a host, where the target notification is sent by the host, so as to realize communication between the host and the PCIE accelerator card provided on the host, in particular, to realize the function of sending data to the PCIE accelerator card by the host.

In some alternative implementations, the data receiving device is usually a host, the target accelerator card is usually provided on the host, and the target notification is sent by the target accelerator card, so as to realize communication between the host and the PCIE accelerator card provided on the host, in particular, to realize the function of transmitting data to the host by the PCIE accelerator card. The execution subject can call the target interface to acquire the target data moved to the target storage area in the following ways: the execution subject (host) can call the target interface to move the target data from the target storage area to the memory of the host by direct memory access, and then can acquire the data moved to the memory.

In some alternative implementations, after calling the target interface to parse the target data and submitting a parsing result to the protocol stack, the upper protocol stack can determine whether the destination address of the target data is the address of the host. If it is determined that the destination address of the target data is not the address of the host, the target accelerator card corresponding to the destination address can be found as the data receiving accelerator card. Here, the data receiving accelerator card is usually installed in the host, and a plurality of PCIE accelerator cards can be installed on the execution subject (i.e. the host), and there are accelerator cards other than the target accelerator card. Then, the execution subject can call the target interface to move the target data from the memory in the host to the target storage area of the data receiving accelerator card by direct memory access. Thereafter, the execution subject may send a second notification to the data receiving accelerator card, and the second notification can be configured to represent that the target data has been stored in the target storage area of the data receiving accelerator card.

In some alternative implementations, before calling the target interface to move the target data from the memory to a target storage area of the data receiving accelerator card by direct memory access, the execution subject can call the target interface to acquire a buffer descriptor from the data receiving accelerator card, and the buffer descriptor can be configured to describe a state and an address of the memory in the double-rate synchronous dynamic random access memory DDR. In particular, the buffer descriptor can be acquired from a storage space of a base address register. Then, the execution subject can use the buffer descriptor to determine the target storage area of the data receiving accelerator card. In particular, the execution subject can determine the address of the memory in the idle state through the buffer descriptor, so that the memory in the idle state can be used as the target storage area of the data receiving accelerator card, so as to move the data to be sent to the memory in the idle state.

Figure 5:
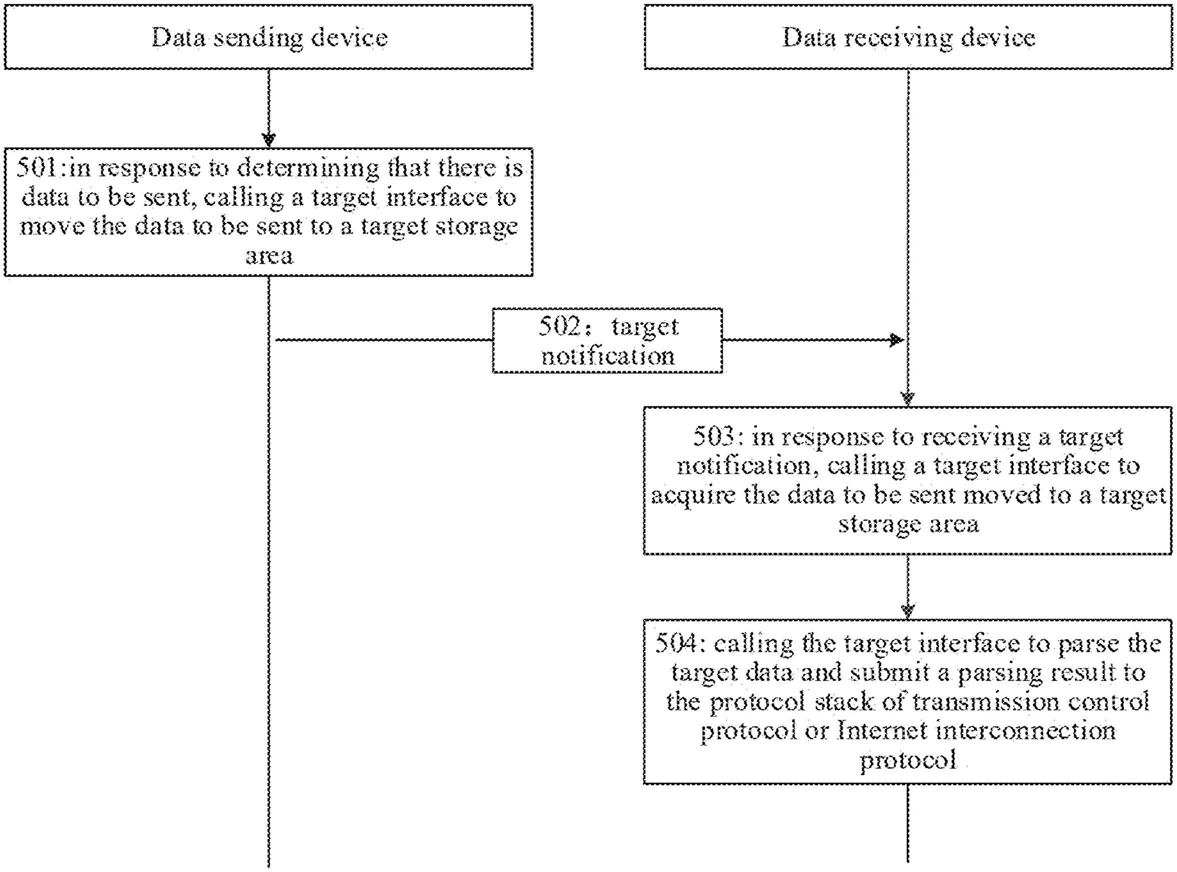
FIG. 5 is a timing diagram of one embodiment of a communication system according to the present disclosure.

Further referring to FIG. 5, a timing diagram of one embodiment of a communication system according to the present disclosure is shown.

The communication system according to the embodiment comprises: a data sending device and a data receiving device. Wherein, the data sending device is configured for, in response to determining that there is data to be sent, calling a target interface to move the data to be sent into a target storage area, and sending a target notification to a date receiving device, wherein the target storage area is a storage area pre-allocated on a double data rate synchronous dynamic random access memory of a target accelerator card, the target accelerator card is a PCIE accelerator card, the data to be sent is data sent into a protocol stack of a transmission control protocol or an Internet interconnection protocol by a target application by calling a Socket interface function, and the target interface is configured for realizing communication between the protocol stack and the target accelerator card; the target notification is configured for representing that the data to be sent has been stored in the target storage area; the data receiving device is configured for, in response to receiving the target notification, calling the target interface to acquire the data to be sent moved to the target storage area, and parsing the data to be sent, and submitting a parsing result to the protocol stack.

As shown in FIG. 5, in Step 501, the data sending device, in response to determining that there is data to be sent, calls a target interface to move the data to be sent to a target storage area.

In this embodiment, the data sending device can determine whether there is data to be sent. The data to be sent is usually data sent to the TCP/IP protocol stack by calling the Socket interface function by a target application, and the target application can be an application operated by a current user. When the user uses the target application, the target application will call the Socket interface function to send data to the protocol stack. Socket is an intermediate software abstraction layer for communication between an application layer and a TCP/IP protocol family, and it comprises a set of interfaces. In the design mode, Socket is actually a facade mode, which hides the complex TCP/IP protocol family behind the Socket interface. For the user, a simple set of interfaces is all, so that Socket can organize data to meet the specified protocol.

If it is determined that there is data to be sent, the data sending device can call the target interface to move the data to be sent to a target storage area. The target storage area is usually a pre-allocated storage area on the double-rate synchronous dynamic random access memory of the target accelerator card. The above target accelerator card is usually a Peripheral Component Interconnect Express accelerator card. PCIE accelerator card is generally configured to accelerate the hardware of a specific processing flow and improve the processing capacity of the system. Here, DDR in the PCIE accelerator card is configured to store running code and data. DDR, also known as DDR SDRAM, is one kind of memory. SDRAM transmits data once in a clock cycle, while DDR transmits data twice in a clock cycle, one on a rising edge and one on a falling edge, which means that one clock cycle can transmit 2 bits of data, so the data transmission rate of DDR is twice the clock frequency.

Here, the target interface is configured to realize the communication between the protocol stack and the target accelerator card. The target interface can also be called a PCIE-based network device sending interface, which is configured to store network data in the protocol stack into the PCIE accelerator card. At the beginning, the target interface needs to be registered with TCP/IP protocol stack as a standard network device sending interface, and the bottom layer calls this interface to complete data sending and receiving.

In Step 502, the data sending device calls the target interface to send a target notification to the data receiving device.

In this embodiment, the data sending device can call the target interface to send a notification to the data receiving device, and the notification can be configured to represent that the data to be sent has been stored in the target storage area.

In Step 503, the data receiving device, in response to receiving a target notification, calls a target interface to acquire the data to be sent moved to a target storage area.

In this embodiment, the data receiving device can determine whether a target notification has been received. If the target notification is received, the data receiving device can call the target interface to acquire the target data moved to the target storage area. The above-mentioned target data is usually the data moved to the target storage area after the data sending device determines that there is data to be sent.

In Step 504, the data receiving device calls the target interface to parse the target data and submit a parsing result to the protocol stack of transmission control protocol or Internet interconnection protocol.

In this embodiment, the data receiving device can call the target interface to parse the target data and submit a parsing result to a TCP/IP protocol stack, which sends the parsing result to a target application through a Socket interface function.

Here, the PCIE accelerator card usually uses a virtual MAC address, which includes ID information of the corresponding PCIE accelerator card, so as to quickly locate the specific PCIE accelerator card when sending data. Besides, the PCIE accelerator card can set the host as a gateway, so as to realize communication with an external network device.

According to the system provided by the embodiment of the present disclosure, a data sending device, in response to determining that there is data to be sent, calls a target interface to move the data to be sent to a pre-allocated storage area on a double-rate synchronous dynamic random access memory of a target accelerator card; then, the data sending device calls the target interface to send to a data receiving device a notification that is configured to represent that the data to be sent has been stored in the target storage area; in response to receiving the notification, the data receiving device calls the target interface to acquire the data to be sent that has been moved to the storage area, and parses the data to be sent, and submits a parsing result to a TCP/IP protocol stack. In this way, the IP network device based on PCIE can be realized on the PCIE accelerator card, and the gateway device based on PCIE can be realized on the host. Finally, the host and all PCIE accelerator cards form an IP network to realize the communication between the host and the PCIE accelerator cards so that the functions such as PCIE card operation and maintenance management, hardware upgrade, software debugging and the like can be efficiently realized.

In some alternative implementations, the data sending device can call the target interface to acquire a first buffer descriptor from the target accelerator card. The above first buffer descriptor can be configured to describe a state and an address of the memory in the double-rate synchronous dynamic random access memory DDR. The state of memory usually includes an idle state and an occupied state. Then, the data sending device can determine the target storage area based on the first buffer descriptor. In particular, the data sending device can determine the address of the memory in the idle state through the first buffer descriptor, so that the memory in the idle state can be used as the target storage area, so as to move the data to be sent to the memory in the idle state.

Figure 6:
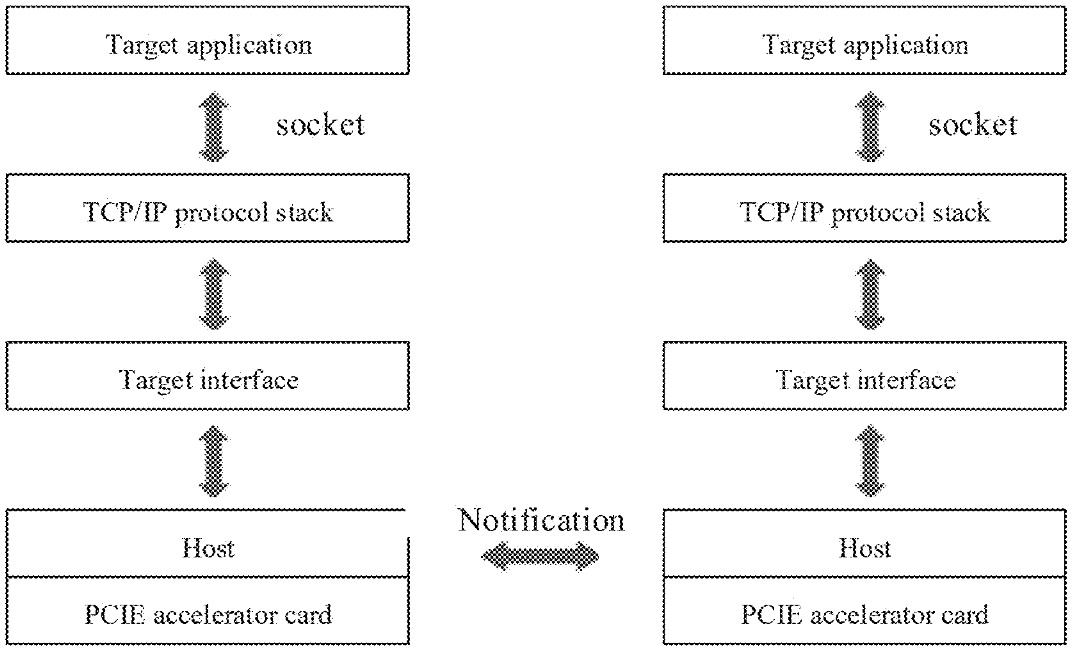
FIG. 6 is a schematic diagram of a communication flow of a communication system according to the present disclosure.

Further referring to FIG. 6, a schematic diagram of a communication flow of a communication system according to the present disclosure is shown. In FIG. 6, the user uses the target application to call the Socket function and send the network data to the TCP/IP protocol stack. After determining that there is network data in the TCP/IP protocol stack, calling the target interface (PCIE-based network device) to fill the corresponding storage area of the PCIE accelerator card. A data sending device (host or PCIE accelerator card) can send a notification to a data receiving device (PCIE accelerator card or host). After receiving the notification, the target interface can be called to acquire the data moved to the target storage area, and parse the acquired data and submit a parsing result to a TCP/IP protocol stack, which can call a Socket interface function to send the parsing result to the target application.

Figure 7:
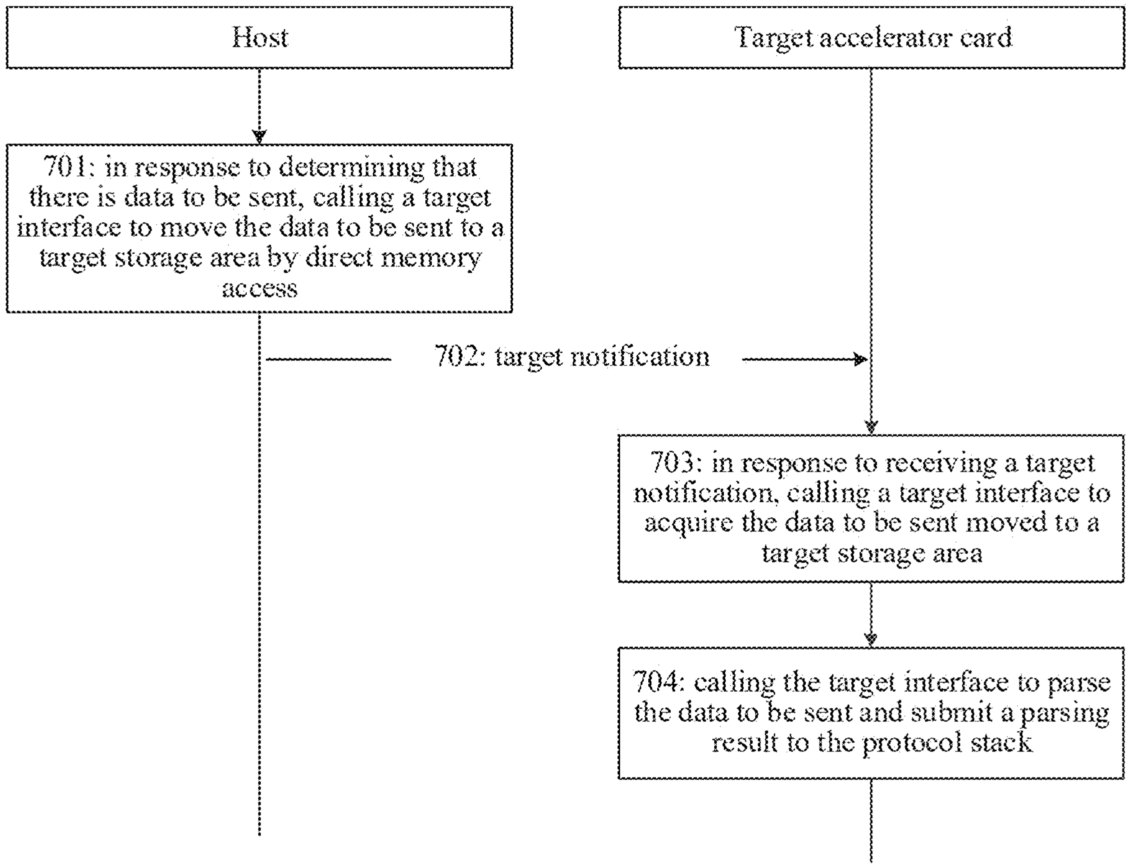
FIG. 7 is a timing diagram of another embodiment of a communication system according to the present disclosure.

Further referring to FIG. 7, a timing diagram of another embodiment of a communication system according to the present disclosure is shown.

As shown in FIG. 7, in Step 701, the host, in response to determining that there is data to be sent, calls a target interface to move the data to be sent to a target storage area by direct memory access.

In this embodiment, the host can determine whether there is data to be sent. The data to be sent is usually data sent to the TCP/IP protocol stack by calling the Socket interface function by a target application, and the target application can be an application operated by a current user. When the user uses the target application, the target application will call the Socket interface function to send data to the protocol stack. Socket is an intermediate software abstraction layer for communication between an application layer and a TCP/IP protocol family, and it comprises a set of interfaces. In the design mode, Socket is actually a facade mode, which hides the complex TCP/IP protocol family behind the Socket interface. For the user, a simple set of interfaces is all, so that Socket can organize data to meet the specified protocol.

If it is determined that there is data to be sent, the host can call a target interface to move the data to be sent to a target storage area by direct memory access. The target storage area is usually a pre-allocated storage area on the double-rate synchronous dynamic random access memory of the target accelerator card. The target accelerator card is usually provided on the host. The above target accelerator card is usually a Peripheral Component Interconnect Express accelerator card. PCIE accelerator card is generally configured to accelerate the hardware of a specific processing flow and improve the processing capacity of the system. Here, DDR in the PCIE accelerator card is configured to store running code and data. DDR, also known as DDR SDRAM, is one kind of memory. SDRAM transmits data once in a clock cycle, while DDR transmits data twice in a clock cycle, one on a rising edge and one on a falling edge, which means that one clock cycle can transmit 2 bits of data, so the data transmission rate of DDR is twice the clock frequency.

Direct memory access allows hardware devices with different speeds to communicate without relying on a large number of interruption loads of CPU (Central Processing Unit). Otherwise, the CPU needs to copy the data of each fragment from the source to a register, and then write it back to a new place again. During this period, the CPU is unavailable for other work.

Here, the target interface is configured to realize the communication between the protocol stack and the target accelerator card. The target interface can also be called a PCIE-based network device sending interface, which is configured to store network data in the protocol stack into the PCIE accelerator card. At the beginning, the target interface needs to be registered with TCP/IP protocol stack as a standard network device sending interface, and the bottom layer calls this interface to complete data sending and receiving.

In step 702, the host calls the target interface to send a target notification to the target accelerator card.

In this embodiment, the host can call the target interface to send a notification to a target accelerator card, and the notification can be configured to represent that the data to be sent has been stored in the target storage area of the target accelerator card.

In Step 703, the target accelerator card, in response to receiving a target notification, calls a target interface to acquire the data to be sent moved to a target storage area.

In this embodiment, the target accelerator card can determine whether a target notification has been received. If the target notification is received, the target accelerator card can call the target interface to acquire the data to be sent moved to the target storage area.

In Step 704, the target accelerator card calls the target interface to parse the data to be sent and submit a parsing result to the protocol stack.

In this embodiment, the target accelerator card can call the target interface to parse the data to be sent and submit a parsing result to a TCP/IP protocol stack, which sends the parsing result to a target application through a Socket interface function.

Here, the PCIE accelerator card usually uses a virtual MAC address, which includes ID information of the corresponding PCIE accelerator card, so as to quickly locate the specific PCIE accelerator card when sending data. Besides, the PCIE accelerator card can set the host as a gateway, so as to realize communication with an external network device.

The system provided by the above embodiment of the present disclosure realizes the communication between the host and the PCIE accelerator card provided on the host, and in particular, realizes the function that the host transmits data to the PCIE accelerator card.

Figure 8:
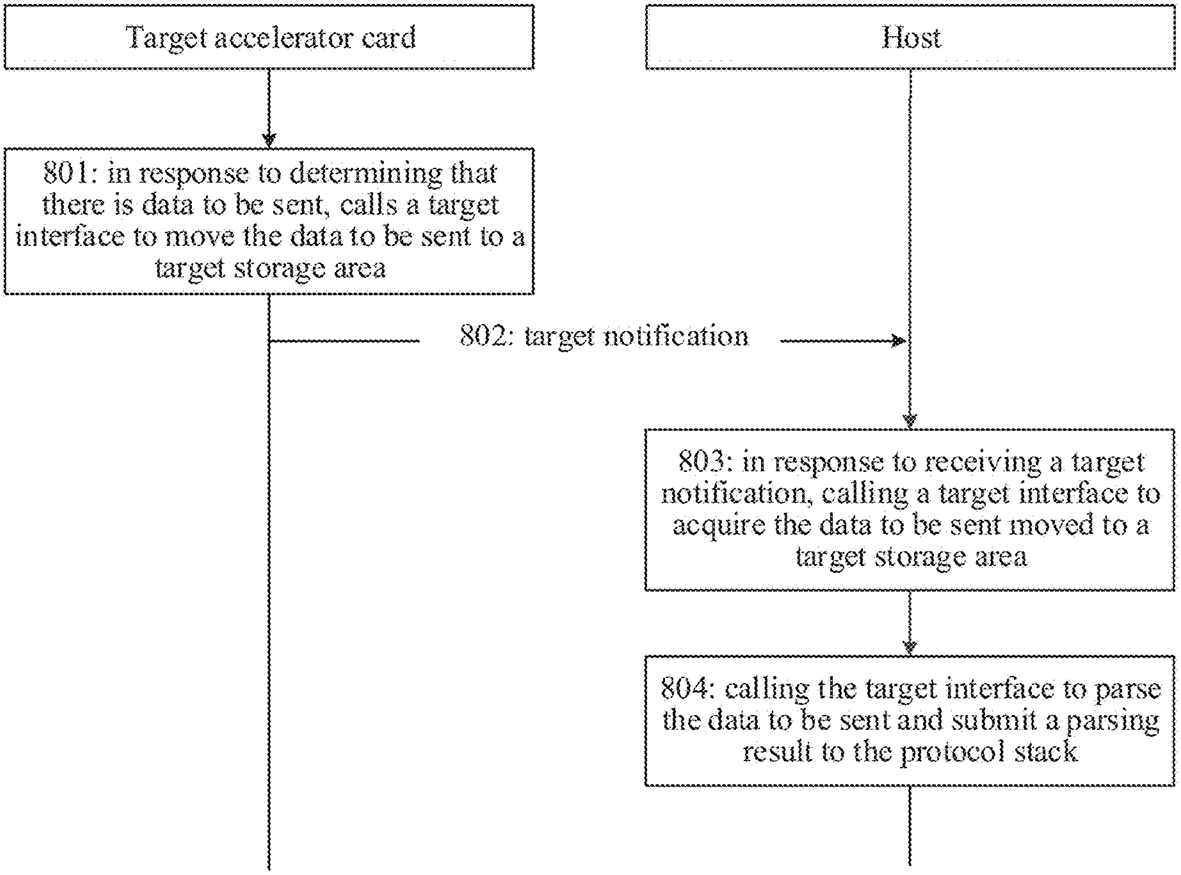
FIG. 8 is a timing diagram of yet another embodiment of a communication system according to the present disclosure.

Further referring to FIG. 8, a timing diagram of yet another embodiment of a communication system according to the present disclosure is shown.

As shown in FIG. 8, in Step 801, the target accelerator card, in response to determining that there is data to be sent, calls a target interface to move the data to be sent to a target storage area.

In this embodiment, the target accelerator card can determine whether there is data to be sent. The data to be sent is usually data sent to the TCP/IP protocol stack by calling the Socket interface function by a target application, and the target application can be an application operated by a current user. When the user uses the target application, the target application will call the Socket interface function to send data to the protocol stack. Socket is an intermediate software abstraction layer for communication between an application layer and a TCP/IP protocol family, and it comprises a set of interfaces. In the design mode, Socket is actually a facade mode, which hides the complex TCP/IP protocol family behind the Socket interface. For the user, a simple set of interfaces is all, so that Socket can organize data to meet the specified protocol.

If it is determined that there is data to be sent, the target accelerator card can call the target interface to move the data to be sent to a target storage area. The target storage area is usually a pre-allocated storage area on the double-rate synchronous dynamic random access memory of the target accelerator card. The above target accelerator card is usually a Peripheral Component Interconnect Express accelerator card. PCIE accelerator card is generally configured to accelerate the hardware of a specific processing flow and improve the processing capacity of the system. Here, DDR in the PCIE accelerator card is configured to store running code and data. DDR, also known as DDR SDRAM, is one kind of memory. SDRAM transmits data once in a clock cycle, while DDR transmits data twice in a clock cycle, one on a rising edge and one on a falling edge, which means that one clock cycle can transmit 2 bits of data, so the data transmission rate of DDR is twice the clock frequency.

Here, the target interface is configured to realize the communication between the protocol stack and the target accelerator card. The target interface can also be called a PCIE-based network device sending interface, which is configured to store network data in the protocol stack into the PCIE accelerator card. At the beginning, the target interface needs to be registered with TCP/IP protocol stack as a standard network device sending interface, and the bottom layer calls this interface to complete data sending and receiving.

In step 802, the target accelerator card calls the target interface to send a target notification to the host.

In this embodiment, the target accelerator card can call the target interface to send a notification to a host, and the notification can be configured to represent that the data to be sent has been stored in the target storage area.

In Step 803, the host, in response to receiving a target notification, calls a target interface to acquire the data to be sent moved to a target storage area.

In this embodiment, the host can determine whether a target notification has been received. If the target notification is received, the host can call the target interface to acquire the data to be sent moved to the target storage area.

In Step 804, the host calls the target interface to parse the data to be sent and submit a parsing result to the protocol stack.

In this embodiment, the host can call the target interface to parse the data to be sent and submit a parsing result to a TCP/IP protocol stack, which can send the parsing result to a target application through a Socket interface function.

Here, the PCIE accelerator card usually uses a virtual MAC address, which includes ID information of the corresponding PCIE accelerator card, so as to quickly locate the specific PCIE accelerator card when sending data. Besides, the PCIE accelerator card can set the host as a gateway, so as to realize communication with an external network device.

The system provided by the above embodiment of the present disclosure realizes the communication between the host and the PCIE accelerator card provided on the host, and in particular, realizes the function that the PCIE accelerator card transmits data to the host.

Figure 9:
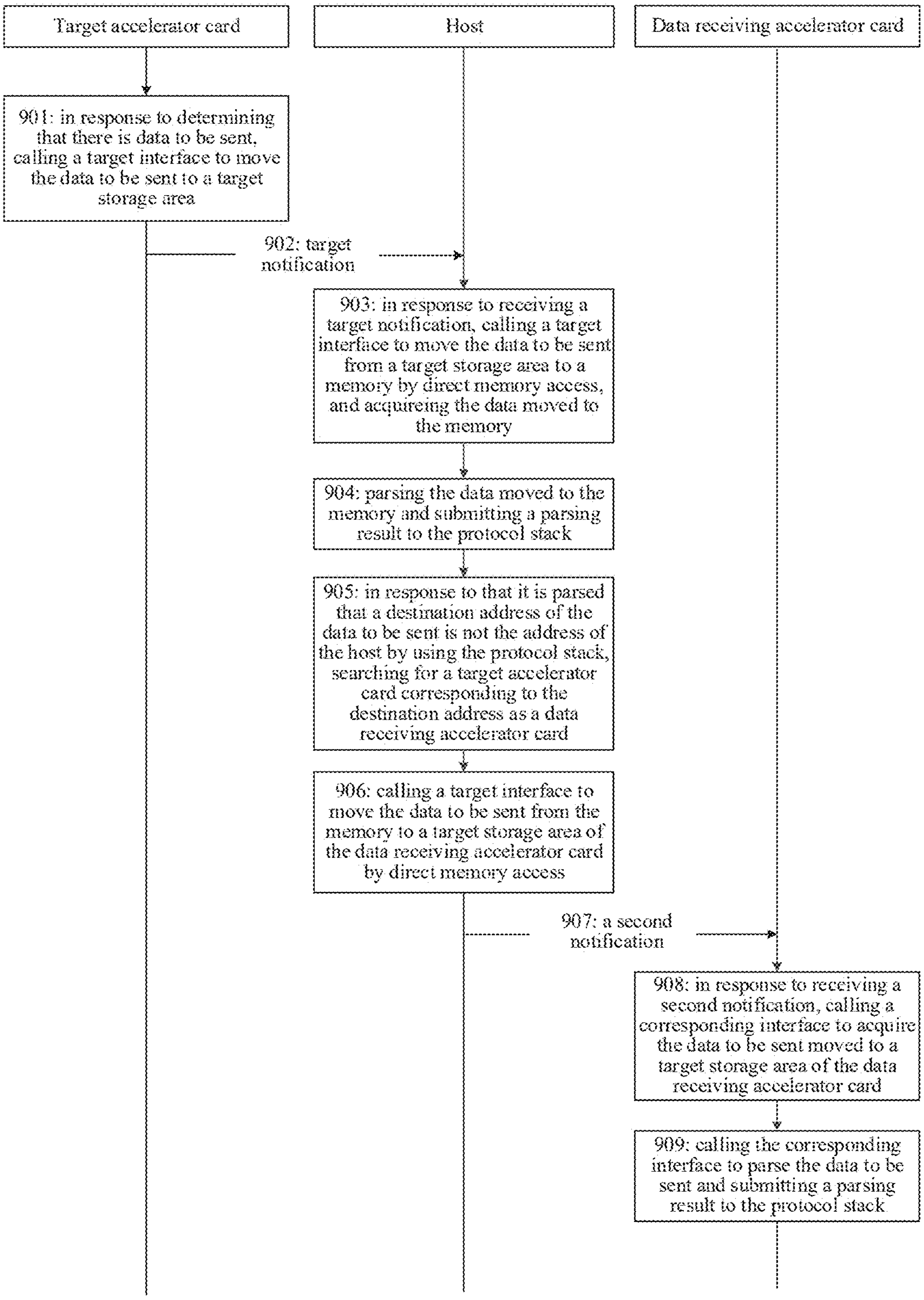
FIG. 9 is a timing diagram of yet another embodiment of a communication system according to the present disclosure.

Further referring to FIG. 9, a timing diagram of yet another embodiment of a communication system according to the present disclosure is shown.

As shown in FIG. 9, in Step 901, the target accelerator card, in response to determining that there is data to be sent, calls a target interface to move the data to be sent to a target storage area.

In this embodiment, the target accelerator card can determine whether there is data to be sent. The data to be sent is usually data sent to the TCP/IP protocol stack by calling the Socket interface function by a target application, and the target application can be an application operated by a current user. When the user uses the target application, the target application will call the Socket interface function to send data to the protocol stack. Socket is an intermediate software abstraction layer for communication between an application layer and a TCP/IP protocol family, and it comprises a set of interfaces. In the design mode, Socket is actually a facade mode, which hides the complex TCP/IP protocol family behind the Socket interface. For the user, a simple set of interfaces is all, so that Socket can organize data to meet the specified protocol.

If it is determined that there is data to be sent, the target accelerator card can call the target interface to move the data to be sent to a target storage area. The target storage area is usually a pre-allocated storage area on the double-rate synchronous dynamic random access memory of the target accelerator card. The above target accelerator card is usually a Peripheral Component Interconnect Express accelerator card. PCIE accelerator card is generally configured to accelerate the hardware of a specific processing flow and improve the processing capacity of the system. Here, DDR in the PCIE accelerator card is configured to store running code and data. DDR, also known as DDR SDRAM, is one kind of memory. SDRAM transmits data once in a clock cycle, while DDR transmits data twice in a clock cycle, one on a rising edge and one on a falling edge, which means that one clock cycle can transmit 2 bits of data, so the data transmission rate of DDR is twice the clock frequency.

Here, the target interface is configured to realize the communication between the protocol stack and the target accelerator card. The target interface can also be called a PCIE-based network device sending interface, which is configured to store network data in the protocol stack into the PCIE accelerator card. At the beginning, the target interface needs to be registered with TCP/IP protocol stack as a standard network device sending interface, and the bottom layer calls this interface to complete data sending and receiving.

In step 902, the target accelerator card calls the target interface to send a target notification to the host.

In this embodiment, the target accelerator card can call the target interface to send a target notification to a host, and the target notification can be configured to represent that the data to be sent has been stored in the target storage area of the target accelerator card.

In Step 903, the host, in response to receiving a target notification, calls a target interface to move the data to be sent from a target storage area to a memory by direct memory access, and acquires the data moved to the memory.

In this embodiment, the host can determine whether a target notification has been received. The host, if receiving the target notification, can call a target interface to move target data from a target storage area of a target accelerator card to a memory of the host by direct memory access, and then, can acquire data in the memory.

In Step 904, the host parses the data moved to the memory and submits a parsing result to the protocol stack.

In this embodiment, the host calls the target interface to parse the data moved to the memory and submits a parsing result to the protocol stack.

In step 905, in response to that it is parsed that a destination address of the data to be sent is not the address of the host by using the protocol stack, the host searches for a target accelerator card corresponding to the destination address as a data receiving accelerator card.

In this embodiment, the host can use the TCP/IP protocol stack to parse the destination address of the data (i.e., the data to be sent) moved into the memory and determine whether the destination address of the data moved into the memory is the address of the host.

If it is determined that the destination address of the data moved to the memory is not the address of the host, the host searches for the target accelerator card corresponding to the destination address as the data receiving accelerator card. Here, the data receiving accelerator card is usually provided in the host, and a plurality of PCIE accelerator cards can be provided in the host, and there are accelerator cards other than the target accelerator card.

In Step 906, the host calls a target interface to move the data to be sent from the memory to a target storage area of the data receiving accelerator card by direct memory access.

In this embodiment, the host can call the target interface to move the data to be sent from the memory of the host to a target storage area of the data receiving accelerator card by direct memory access.

In step 907, the host calls a target interface to send a second notification to the target accelerator card.

In this embodiment, the host can call the target interface to send a second notification to a data receiving accelerator card, and the second notification can be configured to represent that the data to be sent has been stored in the target storage area of the data receiving accelerator card.

In Step 908, the data receiving accelerator card, in response to receiving a second notification, calls a corresponding interface to acquire the data to be sent moved to a target storage area of the data receiving accelerator card.

In this embodiment, the data receiving device can determine whether a second notification has been received. The data receiving accelerator card, if receiving the second notification, can call the corresponding interface to acquire the data to be sent moved to the target storage area of the data receiving accelerator card.

It should be noted that each PCIE accelerator card corresponds to an interface (which can also be called a PCIE-based network device) to realize the communication between the TCP/IP protocol stack and the PCIE accelerator card.

In Step 909, the data receiving accelerator card calls the corresponding interface to parse the data to be sent and submit a parsing result to the protocol stack.

In this embodiment, the data receiving accelerator card can call the corresponding interface to parse the data to be sent and submit a parsing result to a TCP/IP protocol stack, which can send the parsing result to a target application through a Socket interface function.

The system provided by the above embodiment of the present disclosure realizes the communication between the host and a plurality of PCIE accelerator cards provided in the host, and in particular, realizes the function that a PCIE accelerator card transmits data to the host, and then, the host transmits the data to the other PCIE accelerator cards.

In some alternative implementations, the host can call the target interface to acquire a second buffer descriptor from the data receiving accelerator card, and the second buffer descriptor can be configured to describe a state and an address of the memory in the double-rate synchronous dynamic random access memory DDR. In particular, the host can call the target interface to acquire a second buffer descriptor from a storage space of a base address register. Then, the host can use the second buffer descriptor to determine the target storage area of the data receiving accelerator card. In particular, the host can determine the address of the memory in the idle state through the second buffer descriptor, so that the memory in the idle state can be used as the target storage area of the data receiving accelerator card, so as to move the data to be sent to the memory in the idle state.

Figure 10:
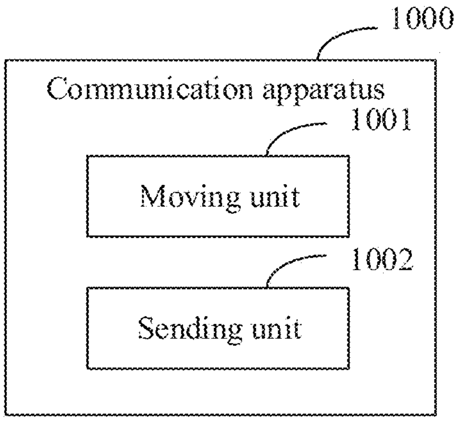
FIG. 10 is a structural schematic diagram of one embodiment of a communication apparatus according to the present disclosure.

Further referring to FIG. 10, as implementation of the method shown in each of the figures, the present application provides an embodiment of a communication apparatus, which corresponds to the method embodiment shown in FIG. 2, and can be particularly applied to various data sending devices.

As shown in FIG. 10, the communication apparatus 1000 of this embodiment comprises a moving unit 1001 and a sending unit 1002. Wherein, the moving unit 1001 is configured for, in response to determining that there is data to be sent, calling a target interface to move the data to be sent into a target storage area, wherein the target storage area is a storage area pre-allocated on a double data rate synchronous dynamic random access memory of a target accelerator card, the target accelerator card is a PCIE accelerator card, the data to be sent is data sent into a protocol stack of a transmission control protocol or an Internet interconnection protocol by a target application by calling a Socket interface function, and the target interface is configured for realizing communication between the protocol stack and the target accelerator card; and the sending unit 1002 is configured for calling the target interface to send a notification to a data receiving device, wherein the notification is configured for representing that the data to be sent has been stored in the target storage area.

In this embodiment, specific processing of the moving unit 1001 and the sending unit 1002 of the communication apparatus 1000 can refer to step 201 and step 202 in the corresponding embodiment of FIG. 2.

In some alternative implementations, the data sending device is a host, a target accelerator card is provided in the host, and the data receiving device is the target accelerator card; and the moving unit 1001 is configured to call a target interface to move the data to be sent to the target storage area by a manner as follows: calling the target interface to move the data to be sent to the target storage area by direct memory access.

In some alternative implementations, the data sending device is a target accelerator card, the data receiving device is a host, and the target accelerator card is provided in the host.

In some alternative implementations, the data sending device is a target accelerator card, the data receiving device is a host, and the host is provided with the target accelerator card and target accelerator cards other than the target accelerator card, and the target storage area is a storage area in the target accelerator card.

In some alternative implementations, the communication apparatus 1000 further comprises a determining unit (not shown in the figure). The determining unit is configured to call the target interface to acquire a buffer descriptor from the target accelerator card, and determine a target storage area based on the buffer descriptor, wherein the buffer descriptor is configured to describe a state and an address of the memory in the double-rate synchronous dynamic random access memory.

Figure 11:
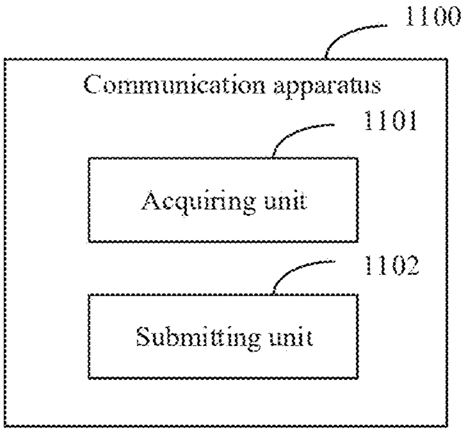
FIG. 11 is a structural schematic diagram of another embodiment of a communication apparatus according to the present disclosure.

Further referring to FIG. 11, as implementation of the method shown in each of the figures, the present application provides another embodiment of a communication apparatus, which corresponds to the method embodiment shown in FIG. 3, and can be particularly applied to various data sending devices.

As shown in FIG. 11, the communication apparatus 1100 of this embodiment comprises an acquiring unit 1101 and a submitting unit 1102. Wherein the acquiring unit 1101 is configured for, in response to receiving a target notification, calling a target interface to acquire target data moved to a target storage area, wherein the target storage area is a storage area pre-allocated on a double data rate synchronous dynamic random access memory of a target accelerator card, the target notification is configured for representing that the target data has been stored in the target storage area, the target accelerator card is a PCIE accelerator card, and the target interface is configured for realizing communication between the protocol stack of transmission control protocol or Internet interconnection protocol and the target accelerator card; the submitting unit 1102 is configured for calling the target interface to parse the target data and submitting a parsing result to the protocol stack.

In this embodiment, specific processing of the acquiring unit 1101 and the submitting unit 1102 of the communication apparatus 1100 can refer to step 301 and step 302 in the corresponding embodiment of FIG. 3.

In some alternative implementations, the data receiving device is the target accelerator card, the target accelerator card is provided in the host, and the target notification is sent by the host.

In some alternative implementations, the data sending device is a host, a target accelerator card is provided in the host, and the target notification is sent by the target accelerator card; and the acquiring unit 1101 is further configured to call a target interface to acquire the target data moved to the target storage area by a manner as follows: calling the target interface to move the target data from the target storage area to a memory by direct memory access, and acquiring the data moved to the memory.

In some alternative implementations, the communication apparatus 1100 further comprises a searching unit (not shown in the figure), a moving unit (not shown in the figure) and a sending unit (not shown in the figure). The searching unit is configured for, in response to determining that a destination address of the target data is not the address of the host by using the protocol stack, searching for a target accelerator card corresponding to the destination address as a data receiving accelerator card, wherein the data receiving accelerator card is provided in the host; the moving unit is configured for calling the target interface to move the target data from the memory to a target storage area of the data receiving accelerator card by direct memory access; the sending unit is configured for send a second notification to the data receiving accelerator card, wherein the second notification is configured for representing that the target data has been stored in the target storage area of the data receiving accelerator card.

In some alternative implementations, the communication apparatus 1100 further comprises a determining unit (not shown in the figure). The determining unit is configured for calling the target interface to acquire a buffer descriptor from the data receiving accelerator card, and determining a target storage area of the data receiving accelerator card based on the buffer descriptor, wherein the buffer descriptor is configured to describe a state and an address of the memory in the double-rate synchronous dynamic random access memory.

Figure 12:
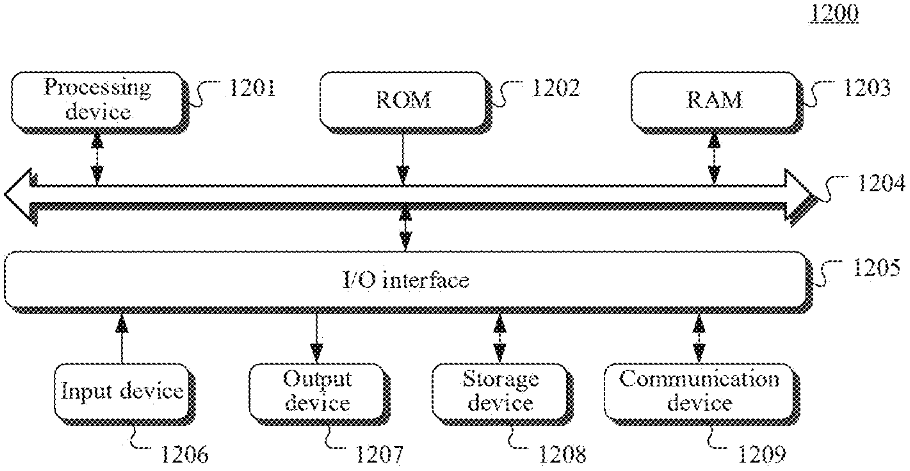
FIG. 12 is a schematic structural diagram of a computer system adapted for implementing an electronic device according to an embodiment of the present disclosure.

Referring now to FIG. 12, there is shown a structural schematic diagram of an electronic device (data sending device or data receiving device) 1200 adapted for implementing an embodiment of the present disclosure. The electronic device shown in FIG. 12 is only an example, and should not be construed to limit function and application scope of the embodiment of the present disclosure.

As shown in FIG. 12, an electronic device 1200 may include a processing device (e.g., a central processor, a graphics processor, etc.) 1201, which may perform various appropriate actions and processes according to a program stored in a read-only memory (ROM) 1202 or a program loaded into a random access memory (RAM) 1203 from a storage device 1208. In the RAM 1203, various programs and data required for operation of the electronic apparatus 1200 are also stored. The processing device 1201, the ROM 1202 and the RAM 1203 are connected to each other through a bus 1204. An input/output (I/O) interface 1205 is also connected to the bus 1204.

Generally, the following devices can be connected to the I/O interface 1205: an input device 1206 including, for example, a touch screen, a touch pad, a keyboard, a mouse, a camera, a microphone, an accelerometer, a gyroscope, etc.; an output device 1207 including, for example, a liquid crystal display (LCD), a speaker, a vibrator, etc.; a storage device 1208 including, for example, a magnetic tape, a hard disk, etc.; and a communication device 1209. The communication device 1209 may allow the electronic device 1200 to communicate wirelessly or wiredly with other devices to exchange data. Although FIG. 12 shows an electronic device 1200 with various devices, it should be understood that it is not required to implement or have all the devices shown. More or fewer devices may alternatively be implemented or provided. Each block shown in FIG. 12 may represent one device or a plurality of devices as needed.

In particular, according to an embodiment of the present disclosure, the process described above with reference to the flowchart can be implemented as a computer software program. For example, the embodiment of the present disclosure comprises a computer program product comprising a computer program carried on a computer-readable medium, the computer program including a program code for executing the method shown in the flowchart. In such an embodiment, the computer program can be downloaded and installed from the network through the communication device 1209, or installed from the storage device 1208, or installed from the ROM 1202. When the computer program is executed by the processing device 1201, the above function defined in the method of the embodiment of the present disclosure is performed. It should be noted that the computer-readable medium mentioned above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device or unit, or any combination of the above. More examples of computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the embodiment of the present disclosure, a computer-readable storage medium can be any tangible medium containing or storing a program, which program can be used by or in combination with an instruction execution system, apparatus or unit. In the embodiment of the present disclosure, a computer-readable signal medium may include a data signal propagated in baseband or as part of a carrier wave, in which computer-readable program code is carried. This propagated data signal can take many forms, including but not limited to an electromagnetic signal, an optical signal or any suitable combination of the above. A computer-readable signal medium can also be any computer-readable medium other than a computer-readable storage medium, which can send, propagate or transmit a program for use by or in connection with an instruction execution system, device or unit. Program code contained in the computer-readable medium can be transmitted by any suitable medium, including but not limited to: a wire, an optical cable, a RF (radio frequency) and the like, or any suitable combination of the above.

The computer-readable medium may be included in the data sending device; or it can exist independently without being assembled into the data sending device. The computer-readable medium carries one or more programs that, when executed by the data sending device, cause the data sending device to, in response to determining that there is data to be sent, call a target interface to move the data to be sent into a target storage area, wherein the target storage area is a storage area pre-allocated on a double data rate synchronous dynamic random access memory of a target accelerator card, the target accelerator card is a PCIE accelerator card, the data to be sent is data sent into a protocol stack of a transmission control protocol or an Internet interconnection protocol by a target application by calling a Socket interface function, and the target interface is configured for realizing communication between the protocol stack and the target accelerator card; call the target interface to send a notification to a data receiving device, wherein the notification is configured for representing that the data to be sent has been stored in the target storage area.

The computer-readable medium may also be included in the data receiving device; or it can exist independently without being assembled into the data receiving device. The computer-readable medium carries one or more programs that, when executed by the data receiving device, cause the data receiving device to, in response to receiving a target notification, call a target interface to acquire target data moved to a target storage area, wherein the target storage area is a storage area pre-allocated on a double data rate synchronous dynamic random access memory of a target accelerator card, the target notification is configured for representing that the target data has been stored in the target storage area, the target accelerator card is a PCIE accelerator card, and the target interface is configured for realizing communication between the protocol stack of transmission control protocol or Internet interconnection protocol and the target accelerator card; call the target interface to parse the target data and submit a parsing result to the protocol stack.

Computer program code for performing operations of the embodiment of the present disclosure may be written in one or more programming languages or their combinations, including object-oriented programming languages, such as Java, Smalltalk, C++, and conventional procedural programming languages, such as "C" language or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or part of codes that contains one or more executable instructions for implementing a specified logical function. It should also be noted that in some alternative implementations, the function noted in the block may occur in a different order than that noted in the drawing. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

According to one or more embodiments of the present disclosure, there is provided a communication method applied to a data sending device, the method comprising: in response to determining that there is data to be sent, calling a target interface to move the data to be sent into a target storage area, wherein the target storage area is a storage area pre-allocated on a double data rate synchronous dynamic random access memory of a target accelerator card, the target accelerator card is a PCIE accelerator card, the data to be sent is data sent into a protocol stack of a transmission control protocol or an Internet interconnection protocol by a target application by calling a Socket interface function, and the target interface is configured for realizing communication between the protocol stack and the target accelerator card; and calling the target interface to send a notification to a data receiving device, wherein the notification is configured for representing that the data to be sent has been stored in the target storage area.

According to one or more embodiments of the present disclosure, the data sending device is a host, a target accelerator card is provided in the host, and the data receiving device is the target accelerator card; and the calling a target interface to move the data to be sent to the target storage area, comprises: calling the target interface to move the data to be sent to the target storage area by direct memory access.

According to one or more embodiments of the present disclosure, the data sending device is a target accelerator card, the data receiving device is a host, and the target accelerator card is provided in the host.

According to one or more embodiments of the present disclosure, the data sending device is a target accelerator card, the data receiving device is a host, and the host is provided with the target accelerator card and target accelerator cards other than the target accelerator card, and the target storage area is a storage area in the target accelerator card.

According to one or more embodiments of the present disclosure, before calling the target interface to move the data to be sent to a target storage area, the method comprises: calling the target interface to acquire a buffer descriptor from the target accelerator card, and determining the target storage area based on the buffer descriptor, wherein the buffer descriptor is configured to describe a state and an address of the memory in the double-rate synchronous dynamic random access memory.

According to one or more embodiments of the present disclosure, there is provided a communication method applied to a data receiving device, the method comprising: in response to receiving a target notification, calling a target interface to acquire target data moved to a target storage area, wherein the target storage area is a storage area pre-allocated on a double data rate synchronous dynamic random access memory of a target accelerator card, the target notification is configured for representing that the target data has been stored in the target storage area, the target accelerator card is a PCIE accelerator card, and the target interface is configured for realizing communication between the protocol stack of transmission control protocol or Internet interconnection protocol and the target accelerator card; calling the target interface to parse the target data and submitting a parsing result to the protocol stack.

According to one or more embodiments of the present disclosure, the data receiving device is the target accelerator card, the target accelerator card is provided in the host, and the target notification is sent by the host.

According to one or more embodiments of the present disclosure, the data receiving device is a host, the target accelerator card is provided in the host, and the target notification is sent by the target accelerator card; and the calling a target interface to acquire the target data moved to the target storage area, comprises: calling the target interface to move the target data from the target storage area to a memory by direct memory access, and acquiring the data moved to the memory.

According to one or more embodiments of the present disclosure, after calling the target interface to parse the target data and submitting a parsing result to the protocol stack, the method further comprises: in response to determining that a destination address of the target data is not the address of the host by using the protocol stack, searching for a target accelerator card corresponding to the destination address as a data receiving accelerator card, wherein the data receiving accelerator card is provided in the host; the moving unit is configured for calling the target interface to move the target data from the memory to a target storage area of the data receiving accelerator card by direct memory access; the sending unit is configured for send a second notification to the data receiving accelerator card, wherein the second notification is configured for representing that the target data has been stored in the target storage area of the data receiving accelerator card.

According to one or more embodiments of the present disclosure, before calling the target interface to move the target data from the memory to a target storage area of the data receiving accelerator card by direct memory access, the method comprises: calling the target interface to acquire a buffer descriptor from the data receiving accelerator card, and determining the target storage area of the data receiving accelerator card based on the buffer descriptor, wherein the buffer descriptor is configured to describe a state and an address of the memory in the double-rate synchronous dynamic random access memory.

According to one or more embodiments of the present disclosure, there is provided a communication system, the system comprising: a data sending device configured for, in response to determining that there is data to be sent, calling a target interface to move the data to be sent into a target storage area, and sending a target notification to a date receiving device, wherein the target storage area is a storage area pre-allocated on a double data rate synchronous dynamic random access memory of a target accelerator card, the target accelerator card is a PCIE accelerator card, the data to be sent is data sent into a protocol stack of a transmission control protocol or an Internet interconnection protocol by a target application by calling a Socket interface function, and the target interface is configured for realizing communication between the protocol stack and the target accelerator card; the target notification is configured for representing that the data to be sent has been stored in the target storage area; the data receiving device is configured for, in response to receiving the target notification, calling the target interface to acquire the data to be sent moved to the target storage area, and parsing the data to be sent, and submitting a parsing result to the protocol stack.

According to one or more embodiments of the present disclosure, the data sending device is a host, the target accelerator card is provided in the host, and the data receiving device is the target accelerator card; and the data sending device is configured for calling the target interface to move the data to be sent to the target storage area by direct memory access; or the data sending device is the target accelerator card, the data receiving device is a host, and the target accelerator card is provided in the host; or the data sending device is a target accelerator card, and the data receiving device is a host, in which the target accelerator card and target accelerator cards other than the target accelerator card are provided, and the target storage area is a storage area in the target accelerator card.

According to one or more embodiments of the present disclosure, the data sending device is configured for calling the target interface to acquire a first buffer descriptor from the target accelerator card, and determining a target storage area based on the first buffer descriptor, wherein the first buffer descriptor is configured to describe a state and an address of the memory in the double-rate synchronous dynamic random access memory.

According to one or more embodiments of the present disclosure, the data sending device is a target accelerator card, the data receiving device is a host, the target accelerator card is provided in the host; and the data receiving device is configured for calling the target interface to move the data to be sent from a target storage area to a memory by direct memory access, and acquiring the data moved into the memory.

According to one or more embodiments of the present disclosure, the data receiving device is configured for, in response to determining that a destination address of the data to be sent is not the address of the host by using the protocol stack, searching for a target accelerator card corresponding to the destination address as a data receiving accelerator card, calling the target interface to move the data to be sent from a memory to a target storage area of the data receiving accelerator card by direct memory access, sending a second notification to the data receiving accelerator card, wherein the second notification is configured for representing that the data to be sent has been stored in the target storage area of the data receiving accelerator card.

According to one or more embodiments of the present disclosure, the data receiving device is configured for calling the target interface to acquire a second buffer descriptor from the target accelerator card, and determining a target storage area of the data receiving accelerator card based on the second buffer descriptor, wherein the second buffer descriptor is configured to describe a state and an address of the memory in the double-rate synchronous dynamic random access memory.

According to one or more embodiments of the present disclosure, there is provided a communication apparatus provided in a data sending device, the apparatus comprising: a moving unit configured for, in response to determining that there is data to be sent, calling a target interface to move the data to be sent into a target storage area, wherein the target storage area is a storage area pre-allocated on a double data rate synchronous dynamic random access memory of a target accelerator card, the target accelerator card is a PCIE accelerator card, the data to be sent is data sent into a protocol stack of a transmission control protocol or an Internet interconnection protocol by a target application by calling a Socket interface function, and the target interface is configured for realizing communication between the protocol stack and the target accelerator card; and a sending unit configured for calling the target interface to send a notification to a data receiving device, wherein the notification is configured for representing that the data to be sent has been stored in the target storage area.

According to one or more embodiments of the present disclosure, the data sending device is a host, the target accelerator card is provided in the host, and the data receiving device is the target accelerator card; and the moving unit is further configured for calling a target interface to move the data to be sent to a target storage area by a manner as follows: calling the target interface to move the data to be sent to the target storage area by direct memory access.

According to one or more embodiments of the present disclosure, the data sending device is a target accelerator card, the data receiving device is a host, and the target accelerator card is provided in the host.

According to one or more embodiments of the present disclosure, the data sending device is a target accelerator card, the data receiving device is a host, and the host is provided with the target accelerator card and target accelerator cards other than the target accelerator card, and the target storage area is a storage area in the target accelerator card.

According to one or more embodiments of the present disclosure, the apparatus comprises a determining unit. The determining unit is configured for calling the target interface to acquire a buffer descriptor from the target accelerator card, and determining a target storage area based on the buffer descriptor, wherein the buffer descriptor is configured to describe a state and an address of the memory in the double-rate synchronous dynamic random access memory.

According to one or more embodiments of the present disclosure, there is provided a communication apparatus provided in a data receiving device, the apparatus comprising: an acquiring unit configured for, in response to receiving a target notification, calling a target interface to acquire target data moved to a target storage area, wherein the target storage area is a storage area pre-allocated on a double data rate synchronous dynamic random access memory of a target accelerator card, the target notification is configured for representing that the target data has been stored in the target storage area, the target accelerator card is a PCIE accelerator card, and the target interface is configured for realizing communication between the protocol stack of transmission control protocol or Internet interconnection protocol and the target accelerator card; a submitting unit configured for calling the target interface to parse the target data and submitting a parsing result to the protocol stack.

According to one or more embodiments of the present disclosure, the data receiving device is a target accelerator card, a target accelerator card is provided in a host, and the target notification is sent by the host.

According to one or more embodiments of the present disclosure, the data receiving device is a host, a target accelerator card is provided in the host, and the target notification is sent by the target accelerator card; and the acquiring unit is further configured for calling a target interface to acquire the target data moved to the target storage area by a manner as follows: calling the target interface to move the target data from the target storage area to a memory by direct memory access, and acquiring the data moved to the memory.

According to one or more embodiments of the present disclosure, the apparatus further comprises a searching unit, a moving unit and a sending unit. The searching unit is configured for, in response to determining that a destination address of the target data is not the address of the host by using the protocol stack, searching for a target accelerator card corresponding to the destination address as a data receiving accelerator card, wherein the data receiving accelerator card is provided in the host; the moving unit is configured for calling the target interface to move the target data from the memory to a target storage area of the data receiving accelerator card by direct memory access; the sending unit is configured for send a second notification to the data receiving accelerator card, wherein the second notification is configured for representing that the target data has been stored in the target storage area of the data receiving accelerator card.

According to one or more embodiments of the present disclosure, the apparatus further comprises a determining unit. The determining unit is configured for calling the target interface to acquire a buffer descriptor from the data receiving accelerator card, and determining a target storage area of the data receiving accelerator card based on the buffer descriptor, wherein the buffer descriptor is configured to describe a state and an address of the memory in the double-rate synchronous dynamic random access memory.

Units involved in the embodiment described in the present disclosure can be realized by software or hardware. The described units can also be arranged in a processor, for example, it can be described as a processor comprising a moving unit and a sending unit, and it can also be described as a processor comprising an acquiring unit and a submitting unit. Wherein, names of units do not constitute limitation of the units themselves in some cases. For example, the sending unit can also be described as "a unit that calls a target interface to send a notification to a data receiving device".

The above description is only the preferred embodiments of the present disclosure and the explanation of the applied technical principles. It should be understood by those skilled in the art that the scope involved in the embodiment of the present disclosure is not limited to technical solutions formed by specific combinations of the above technical features, but also covers other technical solutions formed by any combinations of the above technical features or their equivalent features without departing from the above concept, such as technical solutions formed by replacing the above features with (but not limited to) technical features with similar functions disclosed in the present disclosure.

What is claimed is:

1. A communication method applied to a data sending device, comprising:

in response to determining that there is data to be sent, calling a target interface to move the data to be sent into a target storage area, wherein the target storage area is a storage area pre-allocated on a double data rate synchronous dynamic random access memory of a target accelerator card, the target accelerator card is a peripheral component interconnect express (PCIe) accelerator card, the data to be sent is data sent into a protocol stack of a transmission control protocol or an Internet interconnection protocol by a target application by calling a Socket interface function, the target interface is configured for realizing communication between the protocol stack and the target accelerator card, and the data sending device is the target accelerator card; and calling the target interface to send a first notification to a data receiving device, wherein the first notification is configured for representing that the data to be sent has been stored in the target storage area, wherein the data receiving device is a host, the host is provided with a plurality of PCIe accelerator cards including the target accelerator card, and the host and all PCIe accelerator cards form a network to realize communication between the host and the PCIe accelerator cards, and wherein the method further comprises, in response to determining that a destination address of the data to be sent is not the address of the host, searching for a data receiving accelerator card of the PCIe accelerator cards that corresponds to the destination address, and sending a second notification to the data receiving accelerator card, wherein the second notification is configured for representing that the data to be sent has been stored in the target storage area of the data receiving accelerator card.

2. The method according to claim 1, wherein the calling a target interface to move the data to be sent to a target storage area comprises:

calling the target interface to move the data to be sent to the target storage area by direct memory access.

3. The method according to claim 1, wherein before calling the target interface to move the data to be sent to the target storage area, the method comprises:

calling the target interface to acquire a buffer descriptor from the target accelerator card, and determining the target storage area based on the buffer descriptor, wherein the buffer descriptor is configured for describing a state and an address of the memory in the double-rate synchronous dynamic random access memory.

4. An electronic device, comprising:

at least one processor;

a storage device on which at least one program is stored;

when the at least one program is executed by the at least one processor, the at least one processor is caused to realize the method according to claim 1.

5. A non-transient computer-readable medium, on which a computer program is stored, wherein the program, when executed by a processor, implement the method according to claim 1.

6. A communication method applied to a data receiving device, comprising:

in response to receiving a first notification, calling a target interface to acquire target data moved to a target storage area, wherein the target storage area is a storage area pre-allocated on a double data rate synchronous dynamic random access memory of a target accelerator card, the first notification is configured for representing that the target data has been stored in the target storage area, the target accelerator card is a peripheral component interconnect express (PCIe) accelerator card, the target interface is configured for realizing communication between a protocol stack of transmission control protocol or Internet interconnection protocol and the target accelerator card, and the first notification is sent by the target accelerator card; and calling the target interface to parse the target data and submitting a parsing result to the protocol stack, wherein the data receiving device is a host, the host is provided with a plurality of PCIe accelerator cards including the target accelerator card, and the host and all PCIe accelerator cards form a network to realize communication between the host and the PCIe accelerator cards, and wherein the method further comprises, in response to determining that a destination address of the target data is not the address of the host, searching for a data receiving accelerator card of the PCIe accelerator cards that corresponds to the destination address, and sending a second notification to the data receiving accelerator card, wherein the second notification is configured for representing that the target data has been stored in the target storage area of the data receiving accelerator card.

7. The method according to claim 6, wherein the calling a target interface to acquire target data moved to a target storage area comprises:

calling a target interface to move the target data from the target storage area to a memory by direct memory access, and acquiring the data moved to the memory.

8. The method according to claim 7, wherein the method further comprises:

calling the target interface to move the target data from the memory to a target storage area of the data receiving accelerator card by direct memory access.

9. The method according to claim 8, wherein before the calling the target interface to move the target data from the memory to a target storage area of the data receiving accelerator card by direct memory access, the method comprises:

calling the target interface to acquire a buffer descriptor from the data receiving accelerator card, and determining the target storage area of the data receiving accelerator card based on the buffer descriptor, wherein the buffer descriptor is configured for describing a state and an address of the memory in the double-rate synchronous dynamic random access memory.

10. An electronic device, comprising:

at least one processor;

a storage device on which at least one program is stored;

when the at least one program is executed by the at least one processor, the at least one processor is caused to realize the method according to claim 6.

11. A non-transient computer-readable medium, on which a computer program is stored, wherein the program, when executed by a processor, implements the method according to claim 6.

12. A communication system, comprising:

a data sending device configured for, in response to determining that there is data to be sent, calling a target interface to move the data to be sent into a target storage area, and sending a target notification to a data receiving device, wherein the target storage area is a storage area pre-allocated on a double data rate synchronous dynamic random access memory of a target accelerator card, the target accelerator card is a peripheral component interconnect express (PCIe) accelerator card, the data to be sent is data sent into a protocol stack of a transmission control protocol or an Internet interconnection protocol by a target application by calling a Socket interface function, the target interface is configured for realizing communication between the protocol stack and the target accelerator card, the target notification is configured for representing that the data to be sent has been stored in the target storage area, and the data sending device is the target accelerator card; and the data receiving device configured for, in response to receiving the target notification, calling the target interface to acquire the data to be sent moved to the target storage area, and parsing the data to be sent and submitting a parsing result to the protocol stack, wherein the data receiving device is a host, the host is provided with a plurality of PCIe accelerator cards including the target accelerator card, and the host and all PCIe accelerator cards form a network to realize communication between the host and the PCIe accelerator cards, and wherein the data receiving device is configured for in response to determining that a destination address of the data to be sent is not the address of the host, searching for a data receiving accelerator card of the PCIe accelerator cards that corresponds to the destination address, and sending a second notification to the data receiving accelerator card, wherein the second notification is configured for representing that the data to be sent has been stored in the target storage area of the data receiving accelerator card.

13. The system according to claim 12, wherein the data sending device is configured for calling the target interface to acquire a first buffer descriptor from the target accelerator card, and determining the target storage area based on the first buffer descriptor, wherein the first buffer descriptor is configured for describing a state and an address of the memory in the double-rate synchronous dynamic random access memory.

14. The system according to claim 12, wherein the data receiving device is configured for calling the target interface to move the data to be sent from the target storage area to a memory by direct memory access, and acquiring the data moved to the memory.

15. The system according to claim 14, wherein the data receiving device is configured for calling the target interface to move the data to be sent from the memory to a target storage area of the data receiving accelerator card by direct memory access.

16. The system according to claim 15, wherein the data receiving device is configured for, calling the target interface to acquire a second buffer descriptor from the data receiving accelerator card, and determining the target storage area of the data receiving accelerator card based on the second buffer descriptor, wherein the second buffer descriptor is configured for describing a state and an address of the memory in the double-rate synchronous dynamic random access memory.

* * * * *